United States Patent [19]

Doi et al.

[11] Patent Number: 4,717,755

[45] Date of Patent: Jan. 5, 1988

[54] PROCESS FOR PRODUCING PROPYLENE POLYMER

[75] Inventors: Yoshiharu Doi; Kazuo Soga, both of Kanagawa; Satoshi Ueki; Makoto Miyazaki, both of Saitama, all of Japan

[73] Assignee: Toa Nenryo Kogyo Kabushiki Kaisha, Tokyo, Japan

[21] Appl. No.: 810,638

[22] Filed: Dec. 19, 1985

[30] Foreign Application Priority Data

Dec. 26, 1984 [JP] Japan ............................... 59-273121

[51] Int. Cl.$^4$ ............................................. C08F 8/00
[52] U.S. Cl. ................................. 525/333.7; 525/383; 526/84
[58] Field of Search ................... 525/333.7; 526/84

[56] References Cited

U.S. PATENT DOCUMENTS

| | | | |
|---|---|---|---|
| 3,173,903 | 3/1965 | Lukach et al. | 525/333.7 |
| 3,528,958 | 9/1970 | Achorn | 525/333.7 |
| 4,234,716 | 11/1980 | Cuypers et al. | 526/84 |
| 4,326,048 | 4/1982 | Stevens et al. | 526/84 |
| 4,547,555 | 10/1985 | Cook et al. | 526/84 |

FOREIGN PATENT DOCUMENTS 994950 8/1976 Canada.

OTHER PUBLICATIONS

Yoshiharu Doi, Satoshi Ueki, and Tominaga Keii, "Preparation of 'Living' Polypropylenes by a Soluble Vanadium-based Ziegler Catalyst", pp. 1359–1361.
Yoshiharu Doi, Satoshi Ueki, and Tominaga Keii, "'Living' Coordination Polymerization of Propene Initiated by the Soluble V(acac)$_3$–Al(C$_2$H$_5$)$_2$Cl System", pp. 814–819.

*Primary Examiner*—Joseph L. Schofer
*Assistant Examiner*—Bernard Lipman
*Attorney, Agent, or Firm*—M. B. Kurtzman

[57] ABSTRACT

A process for producing a propylene polymer having a carbonyl group at the terminal, said process comprising polymerizing propylene to give a living propylene polymer in the presence of a catalyst composed of beta-diketone vanadium chelate and an aluminum compound represented by the formula R$_2$AlX (wherein R is a hydrocarbon group having 1 to 8 carbon atoms and X is a halogen atom), and reacting the living propylene polymer with a carbonylating agent.

7 Claims, No Drawings

PROCESS FOR PRODUCING PROPYLENE POLYMER

FIELD OF THE INVENTION

The present invention relates to a process for producing a propylene polymer having a carbonyl group at the terminal.

PRIOR ART

It is known that if carbon monoxide is present during olefin polymerization in the presence of a Ziegler-Natta catalyst, the polymerization is suspended, with the result that carbon monoxide is interposed between the transition metal-polymer bond. In this case, various chain transfer reactions and termination reactions are operative so that the carbonylation at the terminal takes place in only the few polymer chains which are living at the moment of carbonylation. It is also a feature of polymerizations of this prior art type that they produce polymers with broad molecular weight distribution ($\overline{Mw}/\overline{Mn} > 2$).

PROBLEMS TO BE SOLVED BY THE INVENTION

It is an object of the present invention to provide a nearly monodisperse propylene polymer in which every polymer chain has a carbonyl group.

The present inventors had previously found that a nearly monodisperse living polypropylene is formed when propylene is polymerized using a catalyst composed of V(acetylacetonate)$_3$ and Al(C$_2$H$_5$)$_2$Cl. [Makromol. Chem. 180, 1359 (1979); and Macromolecules., 12, 814 (1979)]

The present inventors found that when this living polypropylene is reacted with a carbonylating agent such as carbon monoxide, carbonyl groups can be introduced into the terminals of almost all the polymer chains. The present invention was completed based on this finding.

MEANS TO SOLVE THE PROBLEMS

SUMMARY OF THE INVENTION

The gist of the invention resides in a process for producing a propylene polymer having a carbonyl group at the terminal, said process comprising polymerizing propylene to give a living propylene polymer in the presence of a catalyst composed of beta-diketone vanadium chelate and an aluminum compound represented by the formula R$_2$AlX (where R is a hydrocarbon group having 1 to 8 carbon atoms and X is a halogen atom), and reacting the living propylene polymer with a carbonylating agent.

Catalyst

The catalyst system used in this invention is composed of beta-diketone vanadium chelate (referred to as the vanadium compound hereinafter) represented by the formula below:

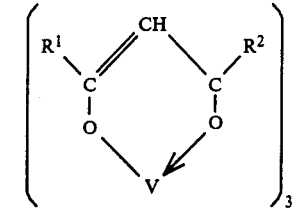

(where R$^1$ and R$^2$ are the same or different alkyl groups or aryl groups) and an aluminum compound represented by the formula R$_2$AlX (where R is a hydrocarbon group having from 1 to 8 carbon atoms, especially an alkyl group or aryl group, and X is a halogen atom).

Examples of the vanadium compound include V(acetylacetonate)$_3$, V(benzoylacetylacetonate)$_3$, and V(dibenzoylmethanate)$_3$. Examples of the aluminum compound include dimethyl aluminum chloride, diethyl aluminum chloride, diethyl aluminum bromide, and diisobutyl aluminum chloride.

PRODUCTION OF LIVING PROPYLENE POLYMER

The living propylene polymer is obtained by homopolymerizing propylene or copolymerizing propylene with ethylene or an alpha-olefin having 4 or more carbon atoms, desirably from 4 to 12 carbon atoms and preferably 1 to 6 carbon atoms (such as 1-butene, 1-hexene, and 4-methyl-1-pentene, excluding propylene) in the presence of the above-mentioned catalyst.

The copolymerization of propylene with ethylene or an alpha-olefin (referred to as comonomer hereinafter) is accomplished by random copolymerization of propylene and comonomer, block copolymerization of propylene homopolymer and comonomer, or block copolymerization of a propylene-comonomer random copolymer and ethylene or an alpha-olefin having 3 or more carbon atoms, desirably 3 to 12 carbon atoms and preferably 3 to 6 carbon atoms.

The polymerization reaction should preferably be carried out in a solvent which is immune to the polymerization reaction and is liquid at the time of polymerization. Examples of the solvent include saturated aliphatic hydrocarbons (such as propane, butane, pentane, hexane, and heptane), saturated alicyclic hydrocarbons (such as cyclopropane and cyclohexane), and aromatic hydrocarbons (such as benzene, toluene, and xylene).

The homopolymerization of propylene or the random copolymerization of propylene with comonomer should preferably be accomplished by adding in succession a solution of the aluminum compound and a solution of the vanadium compound to a solution of propylene or a solution of propylene and comonomer dissolved in a solvent.

In the homopolymerization of propylene or the random copolymerization of propylene with comonomer, the polymerization catalyst is used in such an amount that the vanadium compound is $1 \times 10^{-4}$ to 0.01 mol, preferably $5 \times 10^{-4}$ to $5 \times 10^{-3}$ mol, and the organoaluminum compound is $1 \times 10^{-3}$ to 0.1 mol, preferably $5 \times 10^{-3}$ to 0.01 mol, for 1 mol of propylene or 1 mol of propylene and comonomer in all. In addition, the amount of the organoaluminum compound should be 5 to 25 mol for 1 mol of the vanadium compound.

The molecular weight and yield of the living propylene homopolymer or the living propylene random copolymer may be adjusted by changing the reaction temperature and reaction time. If the polymerization temperature is low, particularly below −50° C., the resulting polymer has a molecular weight distribution which is close to that of monodisperse polymer. Polymerization at −65° C. or below provides a living polymer having and $\overline{M}w/\overline{M}n$ of 1.05 to 1.40 (where $\overline{M}w$ is the weight-average molecular weight and $\overline{M}n$ is the number-average molecular weight).

The polymerization reaction permits the use of a reaction accelerator such as anisole, water, oxygen, alcohols (methanol, ethanol, isopropanol, etc.), and esters (ethyl benzoate, ethyl acetate, etc.). The reaction accelerator is used usually in an amount of 0.1 to 2 mol for 1 mol of the vanadium compound.

The comonomer in the living random copolymer composed of propylene and comonomer usually accounts for up to 80 wt %. This value can be adjusted by changing the amount of comonomer used at the time of living polymerization. When the amount of comonomer, especially ethylene, is increased, the resulting copolymer has a broad molecular weight distribution. This is undesirable. Where a living copolymer of high ethylene content with a narrow molecular weight distribution is to be produced, polymerization should preferably be performed in the following manner. That is, living polymerization for a very small amount of propylene should be performed before living copolymerization for propylene and ethylene. This permits the introduction of a large amount of ethylene into the copolymer, while keeping the molecular weight distribution of the living copolymer narrow. This polymerization method is illustrated with an example below. At first, propylene alone is supplied to the polymerization system to produce living polypropylene having a number-average molecular weight of preferably 500 to 2,000. Then, ethylene is supplied in the presence of a large amount of unreacted propylene monomer to continue living polymerization until the random copolymerization of ethylene and propylene comes to an end.

The thus obtained living homopolymer of propylene or living random copolymer of propylene and comonomer is made into a living block copolymer by living polymerization with a comonomer. This is accomplished by supplying a comonomer (which is different from the one used in the living random copolymerization with propylene) to the system in which the living homopolymer or living random copolymer and propylene are present, and performing living polymerization in the same manner as mentioned above. Usually, the comonomer accounts for up to 50 wt % in the block portion of the block copolymer. This amount can be adjusted by changing the amount of the comonomer used at the time of block copolymerization.

According to the above-mentioned method, it is possible to produce a living propylene polymer having a number-average molecular weight (in terms of propylene [to be repeated hereinafter]) of about 500 to about 1,000,000 which is similar to monodisperse polymers.

Carbonylating Process

When the living propylene polymer comes into contact with a carbonylating agent, the living polymerization stops and, at the same time, the carbonylation proceeds so that a carbonyl group is introduced into the terminal of the polymer chain. Thus the carbonylation of the living propylene polymer is accomplished.

Examples of the carbonylating agent that can be used include carbon monoxide and carbon dioxide. They may be used as such or after dilution with an inert gas or liquid.

The reaction is performed at atmospheric pressure or under pressure, at a temperature of −100° C. to +100° C., preferably −80° C. to 0° C., for 5 minutes to 10 hours.

Incidentally, "carbonylation" as used herein means the introduction of the $>C=O$ group into the polymer molecule.

The propylene polymer which has undergone carbonylation is separated and recovered by the addition of alcohol (methanol, ethanol, etc.) to the reaction system.

In this way it is possible to produce a propylene polymer having an $\overline{M}n$ of about 500 to about 1,000,000 which is similar to monodisperse polymers, said propylene polymer being characterized by that the carbonyl group is introduced into the terminal of almost every polymer chain.

EFFECT OF THE INVENTION

The process of this invention permits the efficient production of a propylene polymer in which the terminals of the polymer chains are carbonylated almost one-hundred percent selectively, the production involving no chain transfer reactions nor termination reactions. The polymer will find use as a compatibilizing agent, surface modifier, viscosity index improver, and drag reducer.

EXAMPLES

The invention is described in more detail with reference to the following examples. The following methods were used to characterize the resulting polymers.

Molecular weight and molecular weight distribution: Measured by the use of GPC (gel permeation chromatography), Model 150, made by Waters Co., Ltd. The solvent was trichlorobenzene. Measuring conditions: 135° C., solvent flow rate =1.0 ml/min, and sample concentration =0.15 wt/vol %. The column was GMH6 made by Toyo Soda Mfg. Co., Ltd. A calibration curve for polystyrene was made for the standard sample of monodisperse polystyrene available from Waters Co., Ltd. On the basis of this calibration curve, a calibration curve for the polypropylene was made according to the universal method.

Determination of carbonyl groups and methyl groups in propylene: Determined by the use of infrared spectrophotometer, Model A-3, made by Nippon Bunko Kogyo Co., Ltd., on the sample polymer formed into a 75 μm thick film.

Content of propylene in ethylene-propylene random copolymer: Determined by means of $^{13}C$ NMR analysis. Model XL-200 with PFT (pulse Fourier transform unit), made by Varian Co., Ltd. Conditions: 50 MHz, 120° C., pulse width 8.2 μs π/3, pulse interval 4 seconds, and integration 5000 times. The sample was dissolved in a 2:1 mixed solvent of trichlorobenzene and heavy benzene.

EXAMPLE 1

In a 200 ml autoclave, with atmosphere therein completely replaced with nitrogen gas, was placed toluene as a solvent, followed by cooling to −78° C. At this temperature, 35 g (0.83 mol) of propylene was added and dissolved in toluene. Then, 5 mmol of $Al(C_2H_5)_2Cl$ in toluene solution and 0.5 mmol of V(acetylacetonate)$_3$ in toluene solution were added to start polymerization at −78° C. Thirty minutes later, carbon monoxide was fed into the autoclave under 30 atm, and the reaction was carried out for 1 hour with stirring. After completion of the reaction, carbon dioxide gas was purged, and the reaction solution was poured into ethanol which had been cooled to −78° C. to precipitate the polymer. The resulting polymer was washed five times with 500 ml of ethanol and dried. The polymer (0.12 g) thus obtained was found to have a molecular weight and molecular weight distribution of $\overline{M}n=2,800$ and $\overline{M}w/\overline{M}n=1.2$, respectively. It was a nearly monodisperse polymer.

Upon examination of the resulting polymer for infrared absorption spectrum, an absorption peak was observed at 1,723 cm$^{-1}$ which is attributable to a carbonyl group. This indicates that carbonyl groups have been introduced into the polymer.

The number of carbonyl groups introduced into one molecule of the polymer chain was calculated from the following formula.

$$[CO] = \left(\frac{41}{440}\right)\left(\frac{A1723}{A1460}\right)\left(\frac{\overline{M}n}{42}\right)$$

where 41 and 440 denote the molar absorptivity at 1,460 cm$^{-1}$ and 1,723 cm$^{-1}$ attributable to polypropylene and carbonyl group, respectively; A1723 and A1460 denote the absorption intensity at 1,723 cm$^{-1}$ and 1460 cm$^{-1}$, respectively; $\overline{M}n$ denotes the number-average molecular weight; and 42 denotes the molecular weight of propylene.

The calculated value of [CO] was 1.0, which apparently indicates that each molecule of the polymer has one molecule of carbonyl group.

EXAMPLES 2 to 5

The polymerization of propylene and the carbonylation reaction were performed in the same manner as in Example 1, except that the feed time and pressure of carbon monoxide were changed as shown in Table 1. The results are shown in Table 1.

TABLE 1

| Example | CO feed time (hour) | CO pres sure (atm) | Polymer yield (g) | Molecular weight $\overline{M}n$ | $\overline{M}w/\overline{M}n$ | [CO] value |
|---|---|---|---|---|---|---|
| 1 | 0.5 | 30 | 0.12 | 2,800 | 1.2 | 1.0 |
| 2 | 1.0 | 1 | 0.48 | 5,800 | 1.2 | 0.9 |
| 3 | 1.0 | 30 | 0.44 | 5,900 | 1.2 | 1.2 |
| 4 | 2.0 | 30 | 0.94 | 11,500 | 1.2 | 1.3 |
| 5 | 20.0 | 30 | 9.42 | 120,000 | 1.3 | 1.2 |

EXAMPLE 6

The polymerization of propylene and the carbonylation reaction were performed in the same manner as in Example 3, except that carbon monoxide was replaced by carbon dioxide at a pressure of 1 atm. There was obtained a polymer having a [CO] value of 0.8.

EXAMPLE 7

In a 1 liter autoclave, with atmosphere therein completely replaced with nitrogen gas, was placed toluene as a solvent, followed by cooling to −78° C. At this temperature, 180 g (4.2 mol) of propylene was added and dissolved in toluene. Then, 0.1 mol of Al(C$_2$H$_5$)$_2$Cl in toluene solution, 5 mmol of V(acetylacetonate)$_3$ in toluene solution, and 2.5 mmol of anisole were added one after another to start the preliminary polymerization at −78° C. One hour later, nitrogen was purged and 4.6 g (0.16 mol) of ethylene was introduced. The copolymerization of ethylene and propylene was carried out at −78° C. for 5 minute under a nitrogen atmosphere, whereby a living ethylene-propylene random copolymer was prepared. (Ethylene-propylene random copolymer is abbreviated as EPR hereinafter.) Subsequently, carbon monoxide was fed at −78° C., and the reaction was carried out for 1 hour with stirring while keeping the pressure of carbon monoxide at 1 atm. Then 9.1 g of the desired polymer was obtained in the same manner as in Example 1. This polymer was examined for molecular weight, molecular weight distribution, propylene content, and [CO] value. The results are shown in Table 2.

EXAMPLES 8 and 9

The synthesis of living EPR and the carbonylation reaction were performed in the same manner as in Example 7, except that the synthesis of living EPR was carried out under the different conditions. The results are shown in Table 2.

TABLE 2

| Example | Polymer yield (g) | Molecular weight $\overline{M}n$ | $\overline{M}w/\overline{M}n$ | Propylene content (wt %) | [CO] value |
|---|---|---|---|---|---|
| 7 | 9.1 | 27,200 | 1.2 | 50 | 0.8 |
| 8 | 14.3 | 43,000 | 1.3 | 50 | 1.2 |
| 9 | 1.03 | 7,500 | 1.2 | 75 | 1.1 |

EXAMPLE 10

A living polypropylene was obtained in the same manner as in Example 7, except that the time for homopolymerization of propylene was changed to 10 hours. Ethylene was fed in the same manner as in Example 7 to carry out copolymerization, whereby a living block copolymer composed of polypropylene segments and EPR segments was synthesized. Subsequently, it was reacted with carbon monoxide in the same manner as in Example 7 to give 15.8 g of polymer having the following characteristic values.

$\overline{M}n$ 50,000 ($\overline{M}n$ 23,000 for polypropylene segments and $\overline{M}n$ 27,000 for EPR segments)
$\overline{M}w/\overline{M}n$ 1.20
[CO] value 1.3

What is claimed is:

1. An essentially monodisperse propylene polymer in which essentially every polymer chain is terminated with a carbonyl group.

2. The propylene polymer of claim 1 wherein the $\overline{M}w/\overline{M}n$ is about 1 to 1.40.

3. The propylene polymer of claim 2 wherein the $\overline{M}n$ is in the range of 500 to 1,000,000.

4. The propylene polymer of claim 1 which is homopolypropylene.

5. The propylene polymer of claim 1 which is a random copolymer of propylene and ethylene or an alpha-olefin having 4 or more carbon atoms.

6. The propylene polymer of claim 1 which is a block polymer comprising homopolypropylene or co-polypropylene.

7. An essentially monodisperse propylene polymer in which essentially every polymer chain is terminated with a carbonyl group, produced by the process comprising the step of polymerizing propylene to give a living propylene polymer in the presence of a catalyst system comprising a beta-diketone vanadium chelate and an aluminum alkyl halide represented by the formula $R_2AlX$, wherein R is a hydrocarbyl group having 1 to 8 carbon atoms and X is a halogen, and reacting the living propylene polymer with a carbonylating agent.

* * * * *